United States Patent Office 3,344,003
Patented Sept. 26, 1967

3,344,003
SOLID PROPELLANT FUEL COMPOSITION CONTAINING EPOXY RESINS BASED ON DIPHENOLIC ACID DERIVATIVES
Thomas J. Miranda, Granger, and Herbert R. Herman, South Bend, Ind., assignors to The O'Brien Corporation, South Bend, Ind., a corporation of Indiana
No Drawing. Original application Nov. 8, 1961, Ser. No. 150,869, now Patent No. 3,296,160, dated Jan. 3, 1967. Divided and this application Aug. 17, 1966, Ser. No. 572,926
10 Claims. (Cl. 149—19)

This is a divisional application of applicant's pending application Ser. No. 150,869, now Patent No. 3,296,160, filed Nov. 8, 1961.

This invention relates to the preparation of resin fuel compositions made by the reaction of alkyl esters of diphenolic acid and resins having epoxy groups therein. More specifically, this invention relates to resins and the process of producing such resins by the reaction of diphenolic acid alkyl esters with compounds having epoxy groups therein and then with drying oil fatty acids or their equivalents.

Diphenolic acid, sometimes referred to herein as DPA, has the more specific name 4,4-bis-(p-hydroxy-phenyl)-n-pentanoic acid. This compound is prepared by the condensation of two moles of phenol with levulinic acid. Alkyl esters suitable for use in the practice of this invention are made from this acid and its nuclear substituted chloro and bromo derivatives by using standard esterification procedures.

While various attempts have been made, in view of the three functional groups in this compound, to use diphenolic acid as a starting material for the preparation of resins, it has been found that such products do not have the desired resistance to alkali and various other chemicals. This is believed to be due to the fact that the phenolic hydroxy groups are not completely reacted or that they form derivative groups which are unstable in the presence of alkali and various other chemicals. For example, attempts to couple together two or more diphenolic acid molecules through the carboxylic acid group results in a bulky product apparently of such three-dimension character that not all of the phenolic hydroxy groups are reacted. Consequently, if these remain unreacted or are reacted with drying oil fatty acids, the resultant product has poor alkali resistance.

In accordance with the present invention, it has now been found possible to make fuel compositions containing oxidants and resins formed by the reaction of the alkyl esters of diphenolic acid, or the corresponding derivatives in which from 1 to 4 positions on the phenylene radicals are occupied by chlorine or bromine. The alkyl groups used in preparing these esters can have as high as 30 carbon atoms although the smaller alkyl groups, that is those having no more than about 15 carbon atoms, are preferred.

In the process of this invention, the diphenolic acid ester or one of the derivatives indicated, is reacted with a compound having two oxirane groups therein. Such compounds can be represented by the formulas

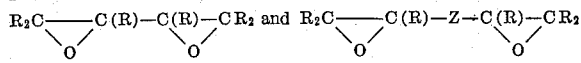

wherein R is hydrogen or an alkyl group as defined above, Z is a divalent hydrocarbon radical or a divalent radical having only hydrocarbon and ether and/or hydroxy oxygen portions therein with the oxygen portions at least one carbon atom removed from each of the valence bonds by which Z is attached to the adjoining carbon atoms of the formula. Z can be aromatic, aliphatic, cycloaliphatic and can include ethylenic or acetylenic or spiro structures therein.

Typical divalent hydrocarbon groups that can be represented by Z or contained as a part thereof are methylene, tetramethylene, hexamethylene, phenylene, cyclohexylene, tolylene, xylene radicals and various combinations connected directly or through ether groups, and derivatives thereof having ether and hydroxy derivative groups therein.

After this reaction has proceeded to the point where substantially all of the phenolic hydroxy groups have reacted with an oxirane group, an ethylenically unsaturated fatty acid, such as a drying oil fatty acid or semidrying oil fatty acid or the equivalent thereof, e.g. various esters, anhydrides, acid chlorides, etc., is reacted to esterify the aliphatic hydroxyl groups or epoxy groups remaining in the reaction product. The resultant products have been found to give improved properties to coatings and other compositions including improved resistance to alkali and various other chemicals, toughness, etc.

The diphenolic acid esters can be prepared by standard methods for preparing esters using the alcohols, esters or other equivalent materials containing the desired alkyl group for substitution on the carboxylic acid group of the DPA or nuclear halogenated derivative. If desired, the diphenolic acid can be converted to the corresponding acid chloride before reaction with alcohol. Moreover, an ester of the desired alkyl group can be used and the alkyl group attached to the carboxylic acid group of the DPA by ester interchange.

Typical alkyl esters of the diphenolic acid and nuclear halogenated derivatives that can be used in the practice of this invention, include but are not restricted to: the methyl, ethyl, propyl, butyl, amyl, hexyl, heptyl, octyl, nonyl, decyl, dodecyl, tetradecyl, hexadecyl, nonadecyl, eicosyl, cyclohexyl, cycloheptyl, cyclohexylethyl, methylcyclohexyl, etc.

Unsaturated fatty acids that can be used include the drying oil fatty acids and semi-drying oil fatty acids, preferably those having at least 10 carbon atoms and no more than about 25 carbon atoms therein. Typical unsaturated fatty acids include, but are not restricted to: undecylenic acid, myristolenic acid, palmitolenic acid, etc., and the fatty acids from linseed oil, oiticica oil, tall oil, tung oil, dehydrated castor oil, isano oil, perilla oil, fish oil, hempseed oil, chia oil, poppyseed oil, soy bean oil, safflow oil, sunflower oil, walnut oil, etc. These can be used in the form of the acid itself or equivalent material such as acid chloride, esters, etc. to effect the esterification.

Monomeric epoxy compounds which can be used to react with the phenolic hydroxy groups are those which have two oxirane radicals therein. Typical oxirane compounds that can be used include, but are not restricted to: the diglycidyl ether of bisphenol, the diglycidyl ether of resorcinol, the diglycidyl ether if dihydroxy diphenyl, divinyl benzene diperoxide, diglycidyl benzene, butadiene diperoxide, isoprene diperoxide, the diperoxide of hexadiene-1,5, diglycidyl ether, divinylcyclohexane diperoxide, diglycidyl ether of dihydroxy cyclohexane, the diglycidyl ethers of ethylene glycol, propylene glycol, butylene glycol, diethylene glycol, triethylene glycol, etc.

Polymers containing at least two oxirane groups therein can also be used for this purpose such as polymers, preferably linear polymers, of the various diglycidyl ethers listed above in which there is a terminal glycidyl group at each end of the polymer molecule, such as for example, those having the formula

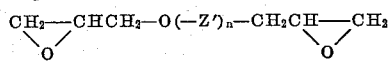

wherein the Z' is a repeating unit whose structure depends on the particular dihydroxy material to which the diglycidyl groups are attached in the monomeric material, and $n$ has a value of 2–20 depending on the size of the polymer molecule. Such polymers can be prepared by standard polymerization methods from the above-listed di-oxirane monomeric compounds, and also from other similar compounds.

The $Z'$ radical in the above formula has a structure derived from that in the monomeric compound. For example when linear polymers are prepared by polymerization of the diglycidyl ether of bisphenol, the polymer structure can be represented by the following formulas or by a structure in which both of the repeating units within the brackets are present in the same polymer molecule.

Fuel compositions of this invention comprise the resins described above in intimate mixture with 10–90%, preferably 50–90% of an oxidant capable of supporting combustion of the resin component. Preferred oxidants are potassium perchlorate, ammonium perchlorate, ammonium nitrate, ammonium persulfate, potassium permanganate, manganese dioxide, potassium iodate, potassium nitrate, potassium dichromate, chloric acid, perchloric acid and aryl perchloryl compounds such as perchloryl benzene, perchloryl naphthalene, etc.

This mixture is advantageously crosslinked after the oxidant has been incorporated therein. The crosslinking is advantageously effected by the presence of a crosslinking

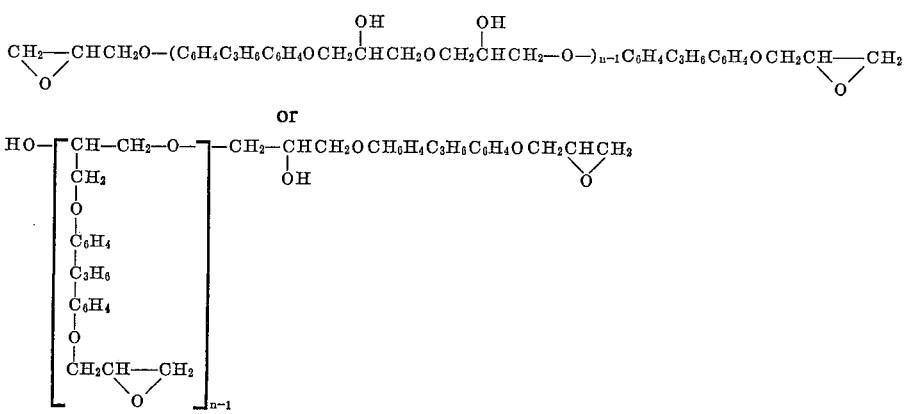

In each case $Z'$ here is the repeating unit portion within the bracket or parentheses. In the first of these two formulas $Z'$ is hydrocarbon except for the ether oxygen and hydroxyl groups and in the second formula $Z'$ is hydrocarbon except for the ether oxygen and the oxirane groups.

The bisphenol referred to herein is well known in the art and is more specifically identified as 2,2-bis(p-phenylol)-propane.

When the polymer is derived from divinylbenzene diperoxide, the linear polymer has one or both of the repeating unit formulas shown in the following formulas:

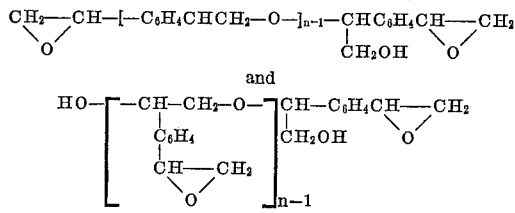

Therefore $Z$ is defined as a divalent radical consisting of hydrocarbon radicals and at least one oxygen group selected from the class consisting of ether, hydroxyl and oxirane groups.

Such polymeric materials can be represented by the following general formulas depending upon which monomeric oxirane compound is used:

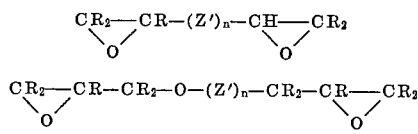

In these formulas, $Z'$ and $n$ are as defined above and R is preferably hydrogen but can also be an alkyl group as defined above, preferably a lower alkyl such as methyl, ethyl, propyl, etc., and it is preferred that the two R groups of an oxirane radical total not more than 10 carbon atoms. As shown above, the $Z'$ in a particular formula need not have the identical structure in every repeating unit.

polyunsaturated monomer such as divinyl benzene, ethylene diacrylate, divinyl ether, ethylene glycol divinyl ether, divinyl phthalate, and other crosslinking monomers. The crosslinking is effected by grafting of the polyunsaturated crosslinking agent to the resin. This grafting is advantageously effected by ionizing radiation. Advantageously at least about 2 megarads of ionizing radiation, preferably at least about 5 megarads, derived from an energy source of at least 100,000 electron volts is used. Other means of effecting such grafting and crosslinking can also be used for example with free radical-generating systems, such as peroxy catalysts, etc.

The invention is best illustrated by the following examples. These are merely for illustrative purposes and are not intended in any way to limit the scope of the invention nor the manner in which the invention may be practiced. Unless specifically indicated otherwise, parts and percentages are given by weight.

EXAMPLE I

A mixture of 158 parts of the methyl ester of diphenolic acid (hereinafter sometimes referred to as DPAM) and 200 parts of monomeric diglycidyl ether of bis-phenol is heated with stirring to 120° C. under a blanket of nitrogen in a reactor equipped with a reflux condenser. As the temperature is increased, a clear solution is obtained. After the temperature is maintained at 120° C. for one hour, a sample drawn from the reaction mixture forms a clear pill on cooling and upon testing shows that there is no unreacted DPAM present. The condenser is then equipped with a water-separating trap and 148.2 parts of tall oil fatty acid and 20 parts of xylene are added to the reaction mixture. The mixture is then heated and held at 232° C. for 4½ hours with water being removed as it is collected. The resin product is used in preparing fuel compositions according to subsequent examples.

EXAMPLE II

The procedure of Example I is repeated a number of times with similar results using respectively in place of the methyl ester of diphenolic acid an equivalent amount of:

(1) the ethyl ester of DPA;
(2) the butyl ester of DPA;
(3) the tetrachloro derivative of the methyl ester of DPA;
(4) the tetrabromo derivative of the ethyl ester of DPA;
(5) the cyclohexyl ester of DPA.

EXAMPLE III

The procedure of Example I is repeated a number of times with similar results using respectively in place of the tall oil fatty acid:

(1) dehydrogenated castor oil fatty acid;
(2) oiticica oil fatty acid;
(3) linseed oil fatty acid.

EXAMPLE IV

The procedure of Example I is repeated a number of times with similar results using respectively in place of the di-oxirane compound an equivalent amount of:

(1) a polymer of the diglycidyl ether of bisphenol having a viscosity of 130 poises and an epoxy equivalent of 185;
(2) a polymer of the diglycidyl ether of bisphenol having 9 poises and an epoxy equivalent of 180, and using an equivalent amount of the diphenolic ethyl ester in place of the methyl ester;
(3) monomeric diglycidyl ether of resorcinol;
(4) monomeric diglycidyl ether of dihydroxy diphenyl;
(5) divinyl benzene diperoxide;
(6) diglycidyl benzene;
(7) butadiene diperoxide;
(8) diglycidyl ether;
(9) divinylcyclohexene diperoxide;
(10) diglycidyl ether of dihydroxy cyclohexane.

EXAMPLE V

A uniform mixture of 0.5 parts of divinyl benzene, 49.5 parts of the resin of Example I and 50 parts of finely divided ammonium perchlorate is pressed into rods and irradiated with 50 megarads from a high energy linear accelerator to effect cure. Upon testing as a solid propellant fuel in a standard specific impulse test for such purpose, this product is found to have a high specific impulse. Potassium perchlorate gives similar results.

EXAMPLE VI

The procedure of Example V is repeated a number of times using in place of the ammonium perchlorate, equivalent amounts of the following oxidants: ammonium persulfate, potassium permanganate, manganese dioxide, potassium iodate, potassium nitrate, potassium dichromate, chloric acid, perchloric acid and perchloryl benzene respectively. Good thrust results are obtained when tested as in Example V.

EXAMPLE VII

The procedure of Example V is repeated a number of times using in place of the divinyl benzene, an equivalent amount of ethylene diacrylate divinyl phthalate, divinyl ether of ethylene glycol and vinyl acrylate. Similar results are obtained in thrust properties as in Example V.

EXAMPLE VIII

The procedure of Example V is repeated a number of times using in place of the resin of that example the respective resins of Examples II, III and IV. Similar results are obtained as in Example V.

EXAMPLE IX

The diacrylyl ester of diphenolic acid is prepared by reacting 2 moles of acrylyl chloride with 1 mole of DPA in accordance with normal procedures for preparing esters. A uniform mixture of 50 parts of finely divided ammonium perchlorate, and a blend of 0.5 parts of the aforementioned diacrylyl ester and 49.5 parts of the resin of Example III is prepared. The resultant mixture is pressed into rods and irradiated in a high energy linear accelerator to effect cure. Upon testing as a solid propellant fuel in a standard specific impulse test for such purpose, this product is found to have a high specific impulse.

Other crosslinking agents known to the art can be used in amounts of 0.1–10% in place of those shown in the above example, and other means of effecting crosslinking can also be used in place of the irradiation technique used therein. For example, the crosslinking can be grafted by means of a peroxy catalyst or other free radical generating catalyst, or a tri or tetra-functional epoxy resin can be used in place of the diacrylyl ester and blended with the resin and the perchlorate and subsequently crosslinked under conditions which will promote the polymerization through the epoxy radicals. Furthermore, 50–90% of the oxidizer such as potassium perchlorate, nitrates, etc. as indicated above can be used in such fuel compositions.

The resins of the preceding examples can also be reacted with aldehydes which will effect condensation through the aromatic nuclei. For example, the tall oil esterified resin of Example I (200 parts) is reacted with 2.5 moles of formalin at 85° C. until a uniform solution is obtained, which takes approximately 5–6 hours. The resultant resin is mixed with oxidant and cured at 275° F. for 30 minutes. A hard, glossy, mar-resistant product is obtained. Other aldehydes such as acetaldehyde, butyl formcel, furfural, etc. can also be used.

The chloro and bromo derivatives referred to above can be prepared by using a chloro- or bromo-phenol in place of the unsubstituted phenol used for condensation with levulinic acid in producing the diphenolic acid. This chloro or bromo derivative should have at least one reactive position open for condensation with the keto group of the levulinic acid. When the para position to the hydroxy group of the phenol is open, the resultant condensation product is a chloro or bromo derivative of the diphenolic acid. When a position other than this para position is open, the resultant derivative is a derivative of an isomer of diphenolic acid. For example, when 2,6-dichlorophenol is condensed with levulinic acid, the product is a tetrachloro derivative in which the 2 ortho positions to the hydroxy group in each nucleus is occupied by chlorine. When 2,4-dichlorophenol is used for the condensation, the resultant tetrachloro derivative is an isomer of the first compound. These isomer derivatives are equivalent for purposes of this invention and are intended to be included within the scope of this invention.

Certain features of this invention have been described in detail with respect to various embodiments thereof. However, it will, of course, be apparent that other modifications can be made within the spirit and scope of this invention, and it is not intended to limit the invention to the exact details shown above except insofar as they are defined in the following claims.

The invention claimed is:

1. A solid propellant fuel composition consisting essentially of 10–90 percent by weight of an oxidant selected from the class consisting of solid inorganic oxidizers and perchloryl aromatic hydrocarbons, and the remainder being essentially the ester reaction product of an ethylenically unsaturated faty acid having about 10–25 carbon atoms in said acid, with the condensation product of
   (1) a compound selected from the class consisting of the alkyl esters of 4,4-bis-p-phenylol)-pentanoic acid and the chloro and bromo nuclear-substituted derivatives thereof having no more than 2 of said bromo and chloro atoms substituted per aromatic nucleus therein, said alkyl group having no more than 30 carbon atoms therein, and
   (2) an oxirane compound selected from the class consisting of oxirane compounds having one of the formulas:

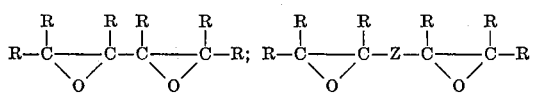

and polymers thereof having no more than about 20 repeating units therein and having at least 2 of said oxirane groups intact therein, in which formulas R is a radical selected from the class consisting of hydrogen and alkyl radicals, the total number of carbon atoms in said R groups in any one of said formulas is no more than 20 carbon atoms, and Z represents a divalent radical having no more than 30 carbon atoms therein selected from the class consisting of divalent hydrocarbon radicals and derivatives thereof having only derivative groups selected from the class consisting of ether and hydroxy derivative groups, said hydroxy and ether derivative groups being at least one carbon atom away from each of the valence bonds by which said Z group is attached to the oxirane radicals of said formulas, said condensation product being formed by the reaction of the hydroxy groups of said 4,4-bis-(p-phenylol)-pentanoic acid compound with said oxirane groups.

2. A composition of claim 1 in which said oxidant is ammonium perchlorate.

3. A composition of claim 2 also containing 0.1–10 parts by weight of a polyunsaturated crosslinking agent which composition has been crosslinked by grafting of said unsaturated crosslinking agent to said ester reaction product.

4. A composition of claim 3 in which said crosslinking has been effected by exposure to at least 5 megarads of ionizing radiation derived from an energy source equivalent to at least 100,000 electron volts.

5. A composition of claim 1 in which said oxidant is potassium perchlorate.

6. A composition of claim 1 in which said oxidant is ammonium persulfate.

7. A composition of claim 1 in which said oxidant is ammonium nitrate.

8. A composition of claim 1 in which said oxidant is perchloryl benzene.

9. A composition of claim 1 in which said oxidant is potassium permanganate.

10. A composition of claim 1 in which said oxidant is manganese dioxide.

References Cited
UNITED STATES PATENTS

| | | | |
|---|---|---|---|
| 3,002,830 | 10/1961 | Barr | 149—19 |
| 3,145,528 | 7/1964 | D'Alelio | 149—19 |
| 3,155,552 | 11/1964 | Vriesen | 149—19 |
| 3,158,991 | 12/1964 | D'Alelio | 149—19 X |

BENJAMIN R. PADGETT, *Primary Examiner.*